(12) United States Patent
Martinez

(10) Patent No.: US 6,726,402 B1
(45) Date of Patent: Apr. 27, 2004

(54) ROADWAY SURFACE GRATING WITH TRASH DETENTION DURING DRIER CONDITIONS

(76) Inventor: Antonio Martinez, 2413 N. Mountain View Rd., El Monte, CA (US) 91733

( * ) Notice: Subject to any disclaimer, the term of this patent is extended or adjusted under 35 U.S.C. 154(b) by 0 days.

(21) Appl. No.: 10/266,506

(22) Filed: Oct. 8, 2002

(51) Int. Cl.[7] .............................. E02B 13/00; E03F 5/06
(52) U.S. Cl. ............................ 405/40; 405/36; 405/37; 405/127; 210/163; 404/4
(58) Field of Search ........................... 405/36, 37, 40, 405/41, 46, 124, 127; 210/163, 164, 170, 532.1, 747; 404/2, 5; 52/11, 14

(56) References Cited

U.S. PATENT DOCUMENTS

| 5,403,474 | A | * | 4/1995 | Emery | 404/4 |
| 6,080,307 | A | * | 6/2000 | Morris et al. | 404/4 |
| 6,106,707 | A | * | 8/2000 | Morris et al. | 210/163 |
| 6,217,756 | B1 | * | 4/2001 | Martinez | 404/4 |
| 6,299,764 | B1 | * | 10/2001 | White et al. | 210/164 |
| 6,368,499 | B1 | * | 4/2002 | Sharpless | 210/164 |
| 6,531,059 | B1 | * | 3/2003 | Morris et al. | 210/170 |
| 2003/0136717 | A1 | * | 7/2003 | Tseng | 210/163 |

FOREIGN PATENT DOCUMENTS

DE 3121487 * 12/1982 ................ 52/12

* cited by examiner

Primary Examiner—Jong-Suk (James) Lee
(74) Attorney, Agent, or Firm—Donald D. Mon

(57) ABSTRACT

A roadway surface drain provided with a grating to detain trash but pass water, a hinged closure plate beneath the grating to close the opening in which the grating is fitted, and linkage to tilt the closure plate to open said opening when the rate of water flow is sufficient, while permitting flow of water and detaining trash when the rate of flow is acceptably slow.

5 Claims, 4 Drawing Sheets

ROADWAY SURFACE GRATING WITH TRASH DETENTION DURING DRIER CONDITIONS

FIELD OF THE INVENTION

Trash detention means between a roadway and a surface drain to close the passage of trash and to pass water at a slow rate, and to open to pass water at a faster rate, while then also permitting passage of solid trash.

BACKGROUND OF THE INVENTION

Roadways must frequently be provided at low spots with drains to carry away surface water. These drains are horizontal openings, usually rectangular, which open into drainage systems. Generally they open into a catch basin that in turn enters into the drainage system that conveys the stream to a distant place.

These drains customarily are covered by a grating such as a grating of steel rods or bars that allow flow of water through openings between them. The problem with these arrangements is that, while water can readily be drained, solid trash can also pass through. Then it enters the catch basin where it must be cleaned out so the system does not plug up and potentially flood the area.

Still, the grating must be available to pass water at all times, and also to support vehicles and people at all times. What is lacking is a selective system which will support people, vehicles and trash and permit slow flow of water during relatively dry times, while excluding trash from the system so it can be picked up by surface means such as a sweeper when the flow is slow or zero. At times of heavy flow, it must open to permit the more rapid flow of water, accompanied by some residual trash that has not been swept up, while still supporting vehicles and people. It is an object of this invention to provide such a system.

BRIEF DESCRIPTION OF THE INVENTION

Apparatus according to this invention is intended to be installed in a roadway surface drain. Such a drain will ordinarily be horizontal, and be placed at a low point in the roadway or shoulder. A grating is fitted in an opening into the drain with strength sufficient to support vehicles or persons expected to run or stand on it. It is an open grating with openings between its rods or bars to pass water through it. It is anticipated that solid trash, as well as water, will reach this grating.

Immediately beneath the grating is a pivoted closure plate, which when closed will permit slow flow of water past it while preventing passage of solid trash. This enables the trash to be swept up before it can enter the drainage system.

An actuator is provided which is linked to the closure plate in such a way as to open the closure plate to permit flow of water at a sufficiently high rate, but remains closed to trash in slow rates (or no flow), while still passing the water at the slow rate.

According to a feature of the invention, a counterweight linkage system holds the closure plate closed until a collector receives enough water to overcome the counterweight. A sufficient rate of flow will keep the closure open while the rate of flow remains sufficiently high.

The above and other features of this invention will be fully understood from the following detailed description and the accompanying drawings, in which:

DETAILED DESCRIPTION OF THE INVENTION

Figure 1:
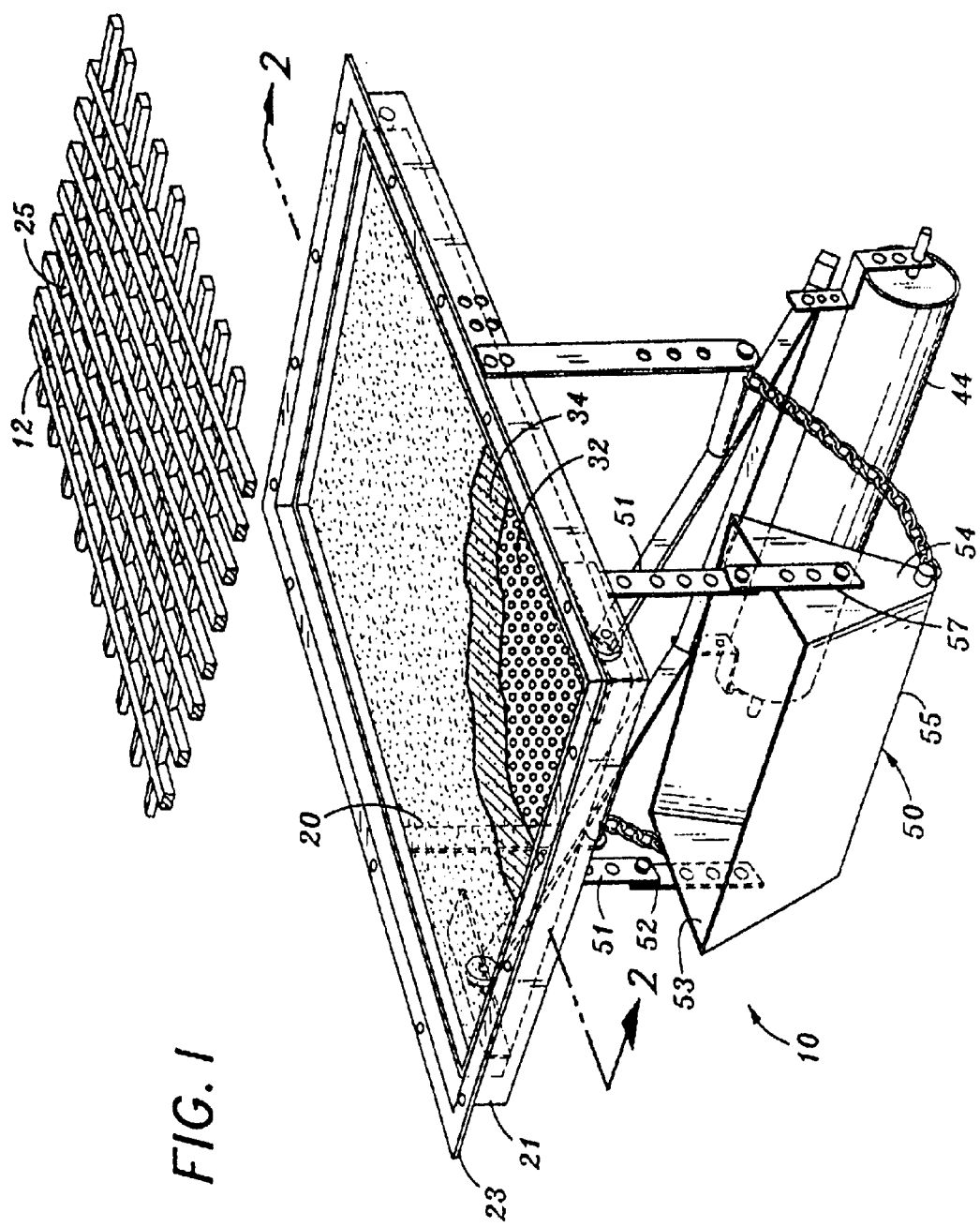
FIG. 1 is an exploded perspective view of the invention.
Figure 2:
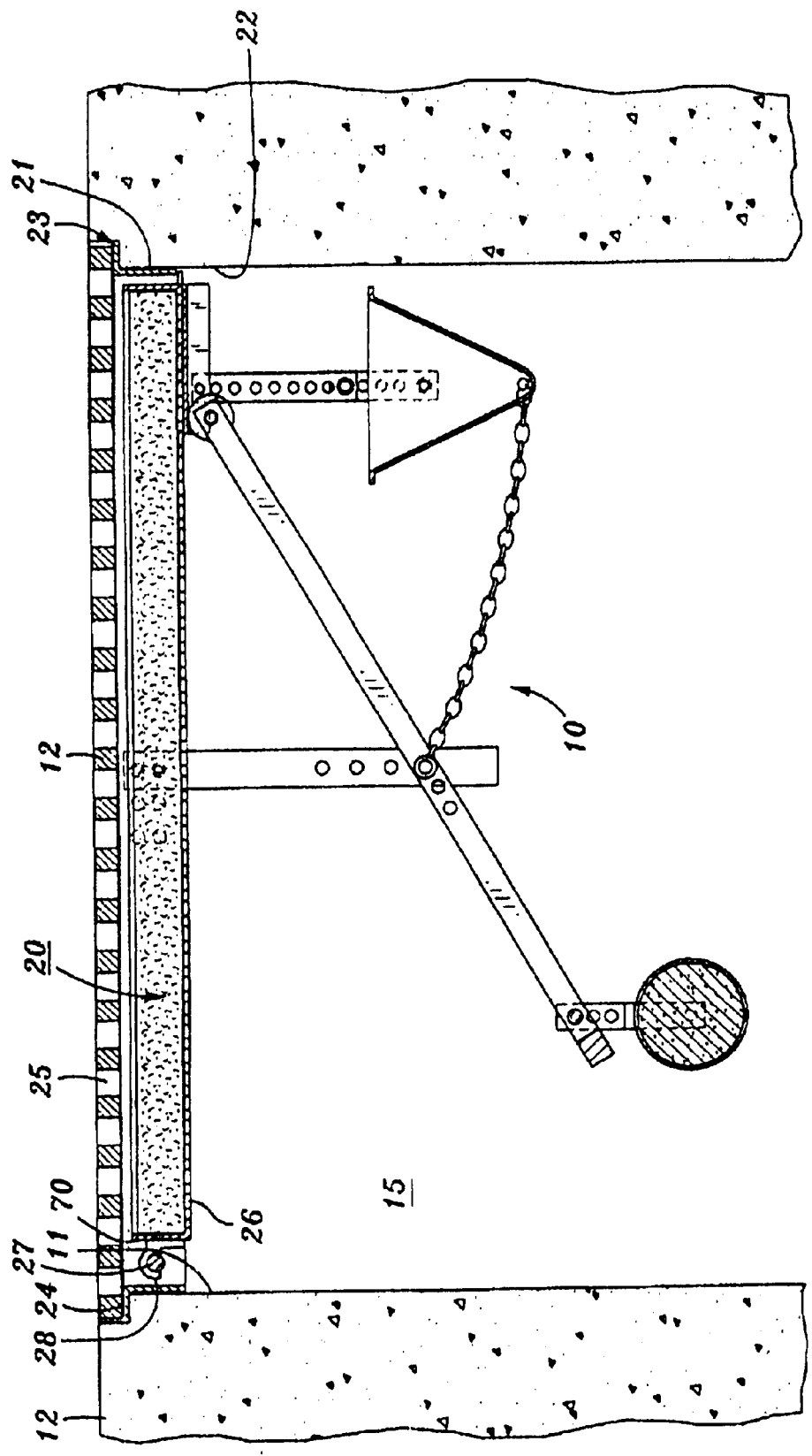
FIG. 2 is a side view, partly in cross-section, showing the apparatus closed.

The presently-preferred apparatus 10 according to this invention is shown in FIGS. 1 and 2. It is fitted in a drain opening 11 in the surface 12 of a roadway. The drain is usually rectangular, and the apparatus is constructed to fit into it.

A catch basin 15 receives water that passes through the opening and discharges it into a typical drainage system (not shown). One purpose of the catch basin is to accumulate solid trash to keep it out of the downstream system. Accordingly they are routinely cleaned out, which is a considerable expense.

If solid trash were excluded from catch basins, these expenses would be saved. But if the means to do so also excluded water, there might be no drainage of water to the catch basin even during times of slow flow, and the surrounding area could be flooded. Equally, if there were no means for exclusion of trash, the catch basin could be plugged up by it, and again a flood could result. There is a special risk in surface drains, because vehicles must run on them at all times.

The classical bar screen incorporates every conceivable disadvantage, because while large pieces of trash can be excluded, passage of vehicles over it can reduce their size to pieces that will pass through the grating. In fact, while a sweeper can remove much of such trash, its brushes can push some of it through the grating.

This invention overcomes the disadvantages of the art by providing a closure plate 20 underneath the grating where it will stop solid trash at the bottom of the grating. A frame 21 is fitted to the periphery 22 of the opening, preferably with a flange 23 fitted against a step 24. Grating 12 fits atop the flange, and has strength sufficient to support vehicle weights that may rest on it. Openings 25 are formed between the rods or bars that form the grating, so that solid trash of objectionable size will be retained for the sweeper to remove, but water can still flow through.

A closure plate 26 is hinged to the frame by a pin 27 and hook 28. Sweepers with a vacuum function can recover smaller pieces that had passed through the grating but are retained by the plate when it is closed. If desired, the plate can be solid, without holes, so as to present a solid surface against the lower surface of the grating.

For certain applications, the contents of the water flow are of interest. This is especially the situation where ultimate flow is to the ocean or to a river. Then local sources of pollution and their detection and identification are of interest.

In this invention, the closure plate is a combination type as shown in FIG. 1, where it can be formed as a pan 30. The pan has a bottom 31 pierced by numerous small holes 32, and sides 33. A filter pad 34 is fitted in the pan, and its top surface 35 is regarded as the upper surface of the closure. In the event that a filter is not to be used, a plate located at surface 35 would be provided. Also, it is possible to use the pan shown without a filter, but it would not be as readily cleaned out.

An actuator 40 is supported on a strap 41 to which a pivot arm 42 is hinged by pin 43. A counterweight 44 hangs from end 45 of arm 42. A contactor 46 is journaled to end 47 of the pivot arm. The contactor is a rotatable wheel that rolls along a flange 48 on (or at the bottom of) the pan near its right hand end in FIGS. 2–4.

Figure 3:
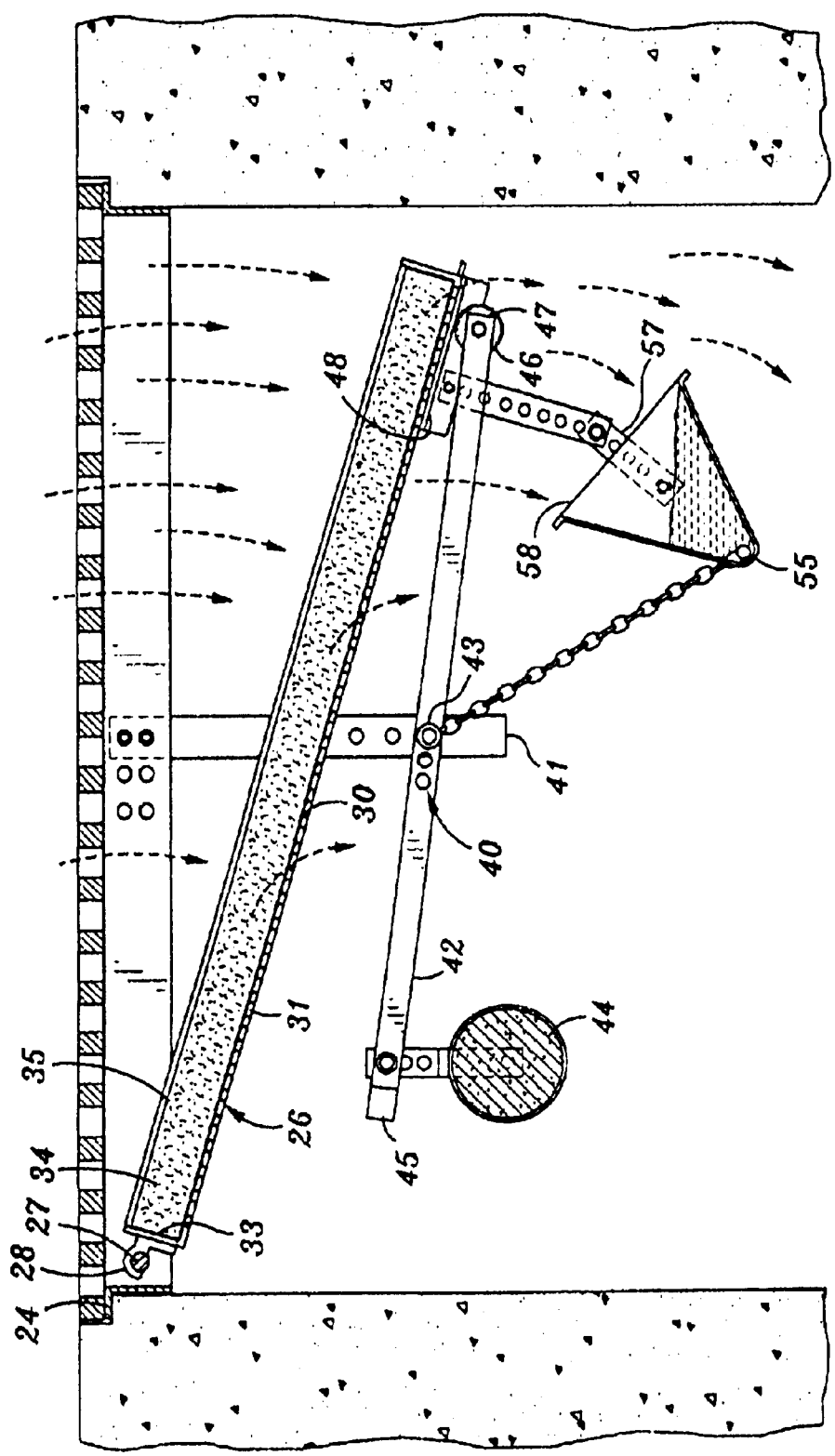
FIG. 3 is a view similar to FIG. 1 with the apparatus partly open.
Figure 4:
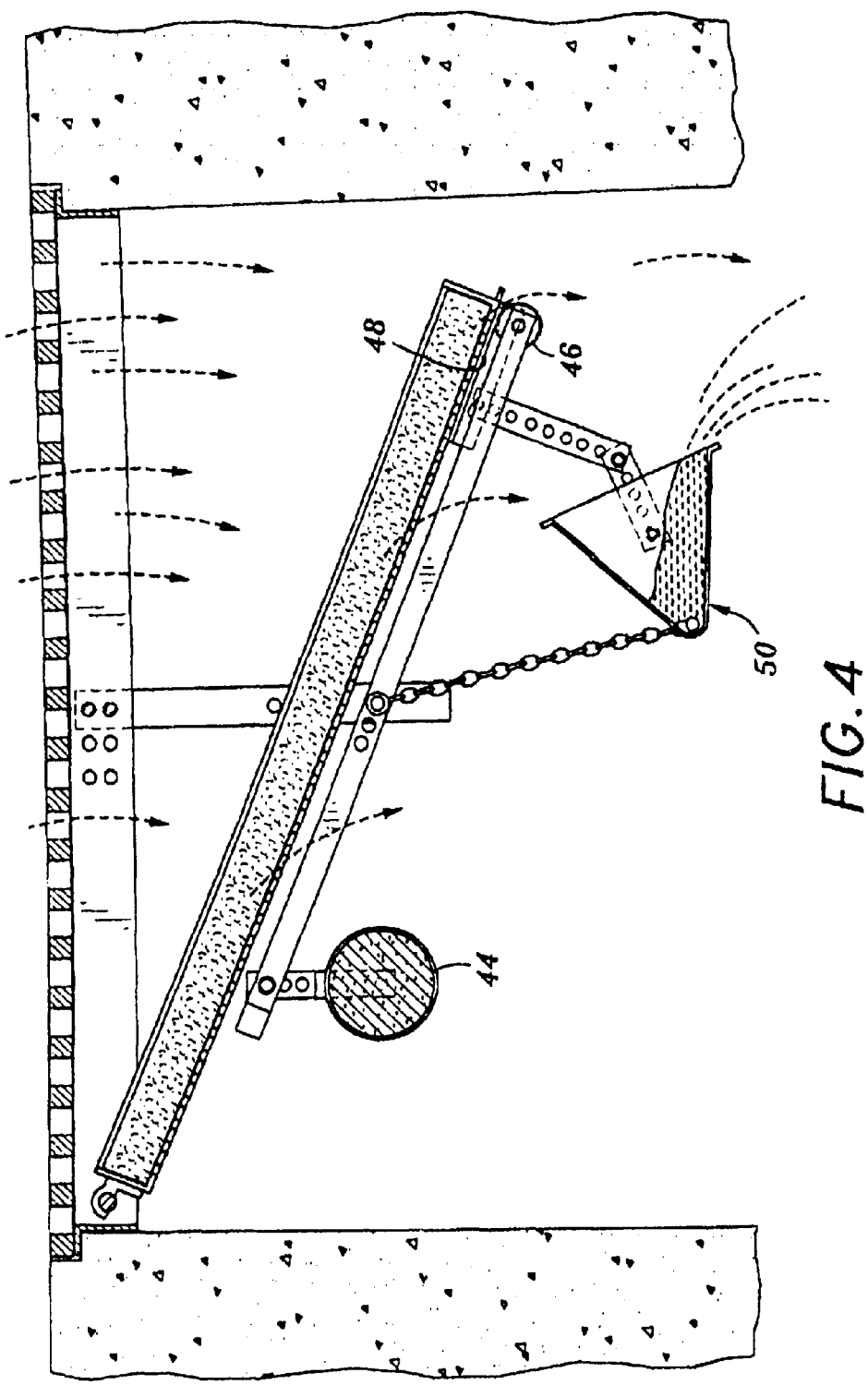
FIG. 4 is a view similar to FIG. 2 showing the apparatus fully open.

Therefore the location of pivot arm 42 will establish the location of the closure. When the counterweight prevails, the closure will close the drain opening (FIG. 2). When it is overcome the plate will open the opening (FIGS. 3 and 4).

A collector 50 is hinged to a flange 51 that depends from the frame of the closure. It can tip relative to the closure, and exerts a downward force near the right hand end of the closure (in FIGS. 2–4) tending to pull that end downward. Notice that the counterweight exerts a continuous upward push on that end, through wheel 46. Its force is constant, while the force exerted by the collector varies.

Collector 50 is a bucket having ends 53, 54, and a wedge shaped bottom 55. Hinge straps 56, 57 are fixed to respective ends 53, 54. The bucket has an open top 58.

One end 60 of a trip chain 61 is fixed to strap 41. The other end of the chain is fixed to the bottom of the bucket. The chain has a defined length when fully extended which permits the bucket to stand upright (FIG. 2) when the closure is closed, and which causes the bucket to tilt (FIGS. 3 and 4) when sufficient water accumulates in the bucket t o overcome the counterweight's torque.

It will be seen in FIG. 2 that the bucket is placed where it will collect water that has passed the closure plate. In the illustrated embodiment some water will have passed through the plate. If desired, the plate can be channeled to direct some water to where it will fall into the bucket. Otherwise, a clearance 70 may be left where, when there is sufficient flow, it will fall into the bucket.

The operation of the apparatus is straightforward. At rest (FIG. 2) the bucket is empty (or not sufficiently filled to overcome the counterweight). Then the counterweight causes the closure to rise and close the opening.

When sufficient water reaches the bucket to overcome the counterweight, the closure will start to tilt. The chain will tighten (FIG. 3) and when the bucket is spilled the closure will again rise.

This arrangement does permit the closure to "dither" when the bucket alternately fills and dumps but this rate is proportional to the flow, and is not objectionable.

When a filter pad is used, its net weight will be considered in the design of the actuator. The pad is optional, as are the holes in the closure plate where a pad is not to be used.

The system is readily serviced and inherently trouble free. During dry periods, and where water flow is slow, it remains closed. Water will simply flow through the clearance 70, or flow through the pad at a rate insufficient to overcome the torque exerted by the counterweight by filling the bucket. The system can be relied upon to open when water flow is rapid, such as when an area is puddled.

This invention is not to be limited by the embodiment shown in the drawings and described in the description, which is given by way of example and not of limitation, but only in accordance with the scope of the appended claims.

I claim:

1. A roadway surface trash detention system adapted to fit in a drain opening of a roadway above a catch basin, said catch basin adapted to receive water which passes from the roadway through said system, said system comprising:

a frame fitted in said drain opening;

a grating mounted to said frame adapted to pass water and detain solid trash from said roadway;

a closure plate hingedly mounted to said frame having a closed position substantially occluding said drain opening but providing said drain opening for water flow past the closure Plate at acceptably low rates of water flow, and having an open position leaving said opening substantially free for flow of water at higher rates of flow;

a linkage establishing the position of the closure plate comprising a lever hingedly mounted to said frame having a first and a second lever arm, a counterweight on said first arm and a receptacle on said second arm having a closed bottom and an open top, said open top being so disposed and arranged as to receive water which has passed said closure plate; and the weight of water in said receptacle when sufficient, can overcome said counterweight and enable the closure plate to tilt and open said drain opening for full flow through said grating, and a trip chain to tilt said receptacle and dump its water when the closure plate has opened said opening.

2. The system according to claim 1 in which said closure plate supports a filter which removes selected pollutants.

3. The system according to claim 1 in which said closure plate is channeled to direct flow toward said receptacle.

4. The system according to claim 1 in which said closure plate is perforated directly to pass some of the water.

5. The system according to claim 1 in which said second arm bears upwardly on a track on said closure plate, the position of the lever arm determining the position of the closure plates.

* * * * *